E. FRANK.
MEASURING TAPE.
APPLICATION FILED AUG. 20, 1917.
1,312,172.
Patented Aug. 5, 1919.
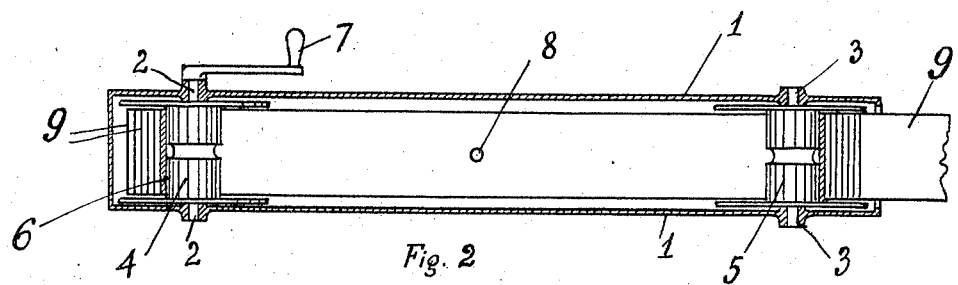
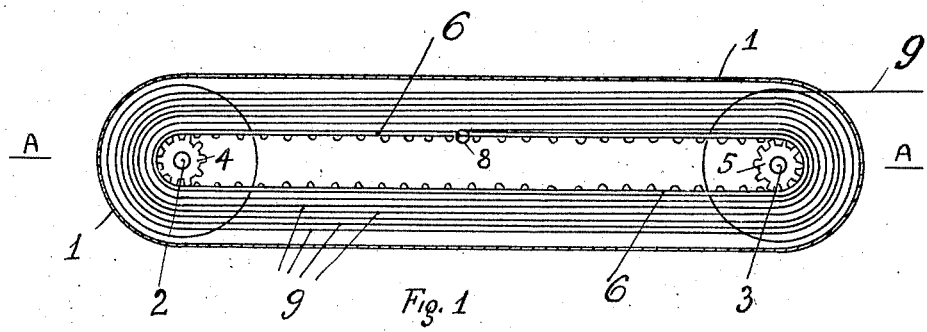
INVENTOR
Edwin Frank

UNITED STATES PATENT OFFICE.

EDWIN FRANK, OF PHILADELPHIA, PENNSYLVANIA.

MEASURING-TAPE.

1,312,172.  Specification of Letters Patent.  Patented Aug. 5, 1919.

Application filed August 20, 1917. Serial No. 187,274.

*To all whom it may concern:*

Be it known that I, EDWIN FRANK, engineer, resident of Philadelphia, in the county of Philadelphia, State of Pennsylvania, have invented certain new and useful Improvements in Measuring-Tapes, of which the following is a specification.

The present invention relates to improvements on apparatus for measuring distances with a flexible band. In its customary form such an apparatus consists of a tape wound on a central spindle, bobbin-like, the whole being inclosed in a cylindrical case; the cases for such tapes, when the tape is long, become bulky and, in particular, are not easily stowed away in the pockets of coats and overcoats, as is often desirable.

The main object of the present invention is to provide a tape of considerable length which is nevertheless of such form that it can be carried conveniently in ordinary pockets.

One of the many possible embodiments of the invention is illustrated in the accompanying drawings.

Figure 1 is a longitudinal section through the apparatus.

Fig. 2 shows a section along the line A—A in Fig. 1 of said apparatus. 1 is the inclosing elongated, non-cylindrical case, whose length is greater than its breadth or its thickness, in which, at the points 2 and 3 are journaled, substantially parallel spindles or sprockets, 4 and 5. An endless band or chain, 6, is stretched taut and travels around said spindles or sprockets. When spindle or sprocket, 4, is turned by means of the handle, 7, the endless band or chain, 6, will travel continuously around the spindles or sprockets, 4 and 5.

To the endless band or chain, 6, is attached, by means of a suitable connection, 8, the measuring tape or flexible measuring band, 9.

It is obvious that the length of tape or measuring band which the case can accommodate will be a function of the distance between the centers of the spindles or sprockets, 4 and 5. And, further, it is obvious that a measuring tape constructed like the one shown in the accompanying drawings can contain a greater length of measuring tape or flexible band than one constructed in the ordinary cylindrical fashion without increasing the essential dimension of the case, the breadth,—the one that determines whether it shall slip easily into a coat or overcoat pocket, or not. Or, in other words, the same length of tape or flexible measuring band contained in a measuring tape of the ordinary cylindrical type, as commonly in use, can now be inclosed in a case whose width is considerably less than the diameter of a cylindrical measuring tape containing the same length of measuring band. That is to say, the handiness of the apparatus has been increased.

What I claim is:

1. A winding instrument having a plurality of axes spaced apart, an endless band surrounding said axes, means to attach a band to be wound on said endless band, and means for moving said endless band.

2. A winding instrument having a plurality of axes spaced apart, an endless band surrounding said axes, means to attach a flexible band to be wound on said endless band, and means for moving said endless band.

3. A winding instrument having a plurality of axes spaced apart, an endless band surrounding said axes, means to attach a measuring band to be wound on said endless band, and means for moving said endless band.

4. A winding instrument consisting of a case, a plurality of axes spaced apart journaled in said case, an endless band surrounding said axes, means to attach a band to be wound on said endless band, and means for moving said endless band.

5. A winding instrument consisting of a frame, a plurality of axes spaced apart journaled in said frame, an endless band surrounding said axes, means to attach a band to be wound on said endless band, and means for moving said endless band.

Philadelphia, August 17, 1917.

EDWIN FRANK.

Copies of this patent may be obtained for five cents each, by addressing the "Commissioner of Patents, Washington, D. C."